US012212355B2

(12) United States Patent
Faizan et al.

(10) Patent No.: US 12,212,355 B2
(45) Date of Patent: Jan. 28, 2025

(54) BIODEGRADABLE COVER FOR A PORTABLE ELECTRONIC DEVICE

(71) Applicant: Mirza Faizan, Irving, TX (US)

(72) Inventors: Mirza Faizan, Irving, TX (US); Zara Majid, Keller, TX (US); Aniq Shaikh, Irving, TX (US); Ali Khan, Arlington, TX (US); Abdullah Mommandi, St. Paul, TX (US); Basith Abdul Syed, Murphy, TX (US); Aayesha Syed Ibrahim, Farmers Branch, TX (US); Saanchi Gabri, Frisco, TX (US); Pranav Kumar, Frisco, TX (US); Prisha Bhat, Richardson, TX (US); Hadia Khatri, Plano, TX (US); Sufiya Khatri, Plano, TX (US); Zaynab Khan, Murphy, TX (US); Mirza Rizwan, Patna (IN); Mishaal Qureshi, Frisco, TX (US); Abdullah Hasani, Murphy, TX (US); Rishika Nandigam, Plano, TX (US)

( * ) Notice: Subject to any disclaimer, the term of this patent is extended or adjusted under 35 U.S.C. 154(b) by 373 days.

(21) Appl. No.: 17/902,941

(22) Filed: Sep. 5, 2022

(65) Prior Publication Data
US 2024/0080057 A1    Mar. 7, 2024

(51) Int. Cl.
*H04B 1/3888*    (2015.01)
(52) U.S. Cl.
CPC ................... *H04B 1/3888* (2013.01)

(58) Field of Classification Search
CPC ........ H04M 1/02; H04B 1/3888; A45C 11/00; A45C 2011/003; A45C 13/02
See application file for complete search history.

(56) References Cited

U.S. PATENT DOCUMENTS

| | | | |
|---|---|---|---|
| 10,027,363 B2 * | 7/2018 | Hsu | H04B 1/3888 |
| 10,649,576 B2 * | 5/2020 | Moon | G06F 1/1677 |
| 10,763,911 B1 * | 9/2020 | Lang | B29C 45/14336 |
| 10,838,462 B1 * | 11/2020 | Monaco | G06F 1/324 |
| 11,076,665 B1 * | 8/2021 | Greene | B65D 5/52 |
| 11,922,254 B2 * | 3/2024 | Rule | H04M 1/72412 |
| 11,957,281 B1 * | 4/2024 | Keegan | A47K 10/42 |
| 2009/0123760 A1 * | 5/2009 | Yui | B29C 66/7379 |
| | | | 428/416 |
| 2012/0008880 A1 * | 1/2012 | Toth | A61B 46/10 |
| | | | 53/469 |

(Continued)

FOREIGN PATENT DOCUMENTS

WO    WO-2022203668 A1 * 9/2022 ............. H04M 1/17

*Primary Examiner* — Nathan S Taylor

(57) ABSTRACT

The present invention envisages a biodegradable cover for a portable device. The cover comprising a top portion including a plurality of adjustable puzzle pieces, wherein said top portion is attached at back wall of said portable device. Each puzzle piece further comprises a square piece and at least one magnetic side piece attached to said square piece, wherein each of said magnetic side piece of first puzzle piece is connected to center of square piece to define length and width of different sizes of portable devices and an expandable portion comprising a right section and a left section, for extending said biodegradable cover along the portable device. The biodegradable cover further includes at least one corner portion to attach said top portion with corners of said portable device.

8 Claims, 2 Drawing Sheets

(56) References Cited

U.S. PATENT DOCUMENTS

| | | | | |
|---|---|---|---|---|
| 2012/0012579 A1* | 1/2012 | Kaplancali | ............ | H04B 1/3888 |
| | | | | 220/4.02 |
| 2014/0268517 A1* | 9/2014 | Moon | ..................... | H05K 7/00 |
| | | | | 361/679.01 |
| 2015/0151515 A1* | 6/2015 | Skepton | ............... | H04B 1/3888 |
| | | | | 428/354 |
| 2017/0099923 A1* | 4/2017 | Mosharrafa | ............ | A45C 11/00 |
| 2017/0179990 A1* | 6/2017 | Wang | ................... | H04B 1/3888 |
| 2018/0064972 A1* | 3/2018 | Cordani | ............... | A62D 1/0064 |
| 2019/0028584 A1* | 1/2019 | Duffin | ................ | H04M 1/72454 |
| 2019/0129469 A1* | 5/2019 | Bacallao | ............. | H02J 7/0044 |
| 2020/0028952 A1* | 1/2020 | Magner | ............. | B65D 83/0835 |
| 2020/0239601 A1* | 7/2020 | Grobe, III | ........... | C08B 37/0063 |
| 2020/0348729 A1* | 11/2020 | Koh | .................... | H04M 1/0214 |
| 2021/0359713 A1* | 11/2021 | Kelley | ................ | H04B 1/3888 |
| 2022/0360289 A1* | 11/2022 | Taylor | ................. | H04B 1/3888 |
| 2023/0297138 A1* | 9/2023 | Ahari Hashemi | .... | G06F 1/1626 |
| | | | | 455/575.8 |
| 2024/0126337 A1* | 4/2024 | Goh | ...................... | G06F 1/1656 |
| 2024/0281026 A1* | 8/2024 | Kopp | .................. | H05K 5/0204 |

\* cited by examiner

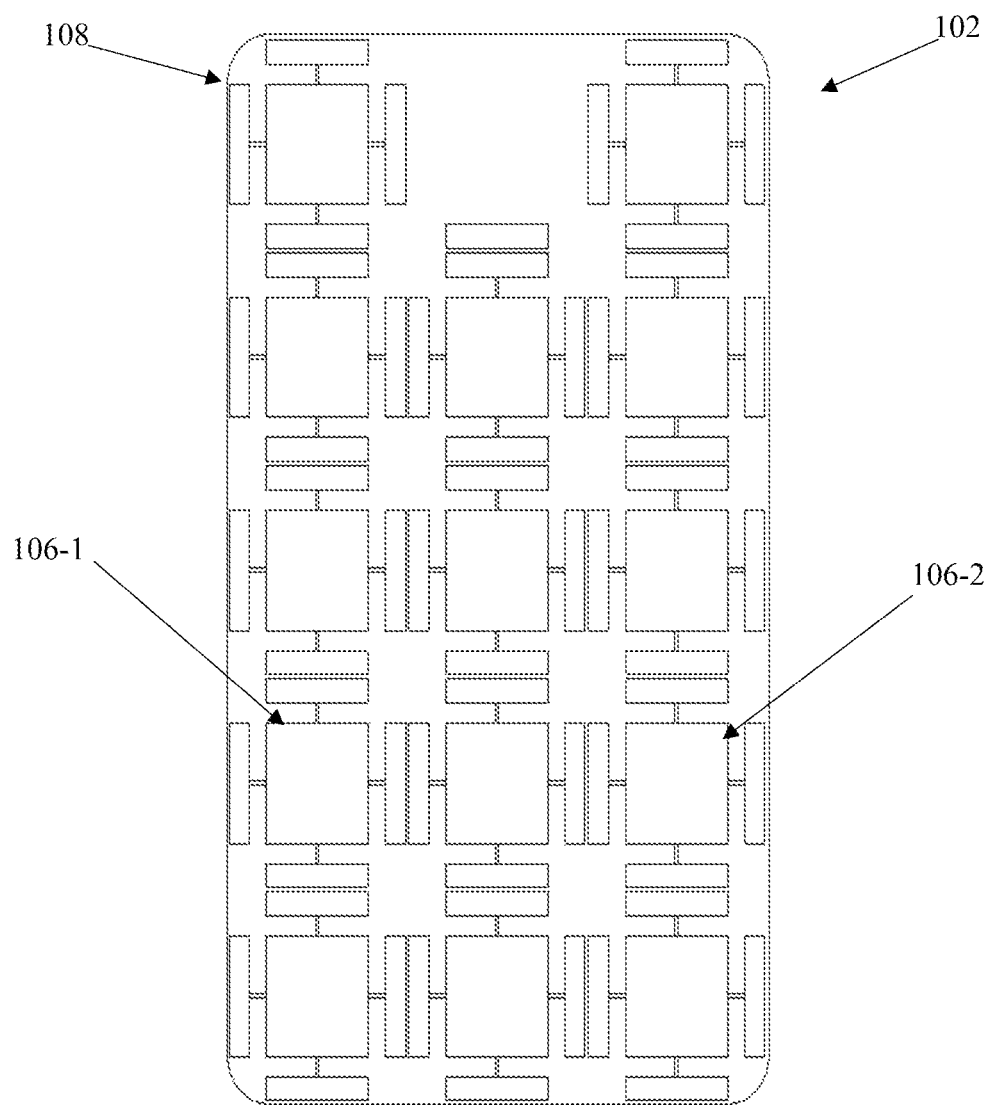
Figure.: 1 A
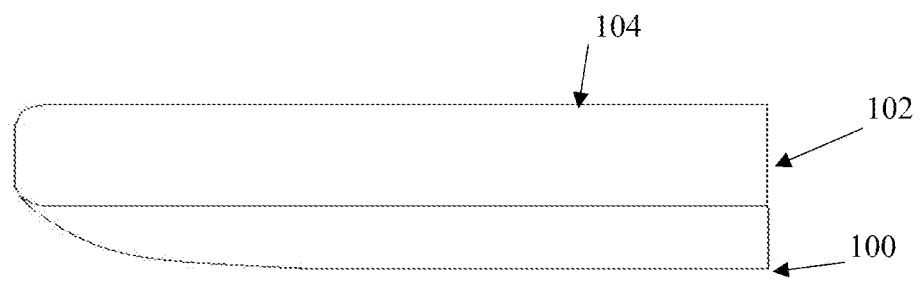
Figure.: 1 B

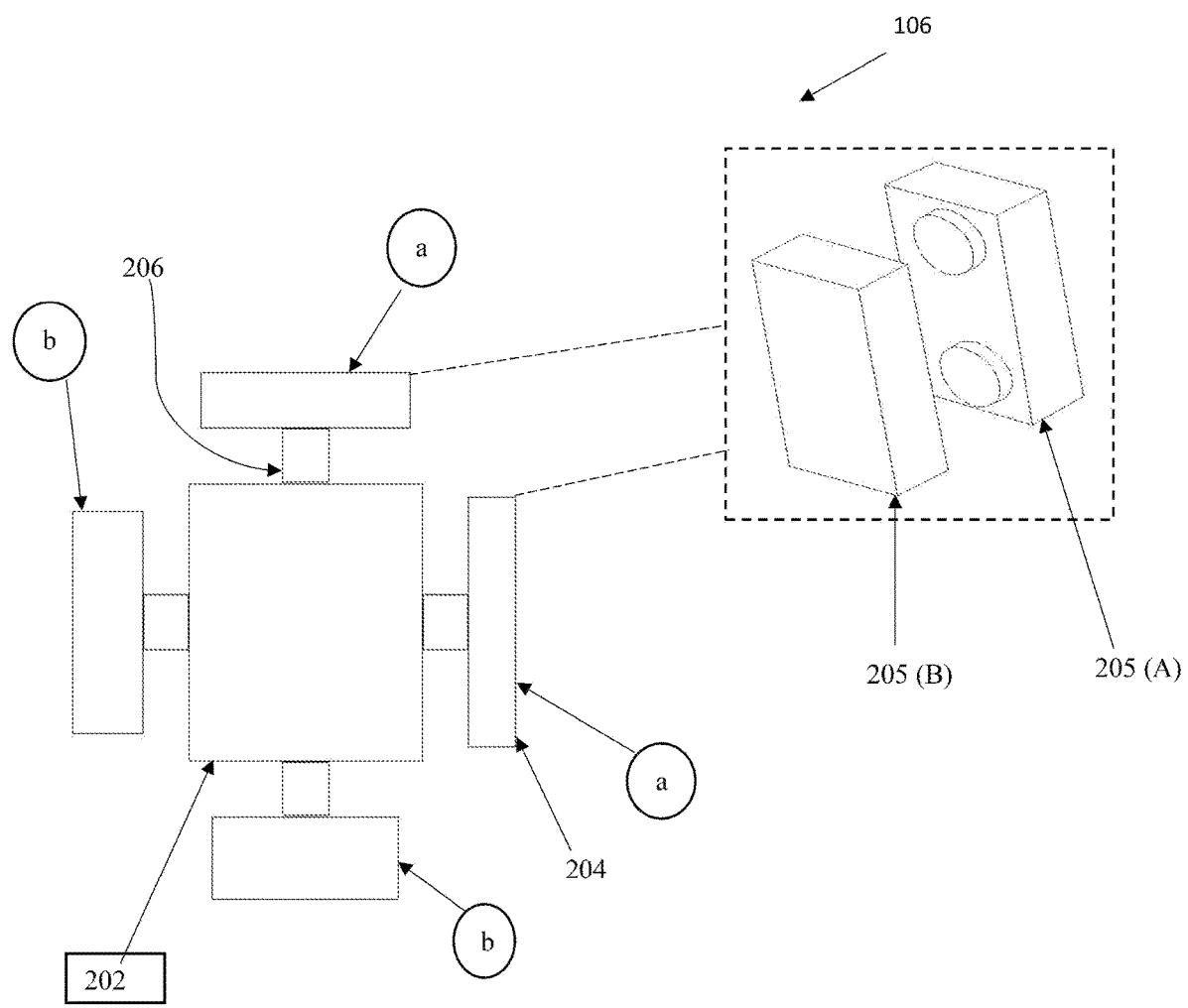
Figure.: 2

BIODEGRADABLE COVER FOR A PORTABLE ELECTRONIC DEVICE

TECHNICAL FIELD

This invention relates to the field of protection for portable electronic devices. More specifically, the invention relates to a cover for portable electronic devices that fits any shape and size of such devices. More so, it protects such devices from any sort of damage.

BACKGROUND

Many types of portable electronic devices are known presently, such as personal digital assistants (PDAs), computers, smartphones, mobile phones, satellite phones, cellular phones, pagers, music players, MP3 players, media players, digital cameras, video cameras, bar code scanner, a global positioning system (GPS), and portable game consoles.

The first smartphones were known for the ability to combine the functions of a personal digital assistant (PDA) and a mobile phone or camera. Modern models also incorporate the functions of portable media players, digital still and video GPS navigation units, and additional electronic capabilities. Today's smartphones typically also include high-resolution touchscreens, web browsers that can access and properly display standard web pages, and high-speed data access via Wi-Fi and mobile broadband links. The confluence of consumer electronic devices and capabilities continues.

The market of electronic devices is quite competitive; therefore, to attract buying audience the big shot players keep on changing the shape, size, structure of these devices. However, a tragic fact is that despite the significant advances in these electronic devices, the protection against damage to the physical body of these devices has seen little evolution. Moreover, the shapes are of these devices are usually smooth bricks accompanied with smooth front, back, and side surfaces, which are the most vulnerable shapes for an easy slip out of the hands of the user. This only risks damaging the outer body of the electronic device but also can lead to the potential loss of valuable data.

The competitors constantly keep changing the structure of the devices for elevating their sales graph. People purchase new phone cases to keep up with new models. In such a scenario, they get rid of their old phone cases by disposing of their old device covers of course. Resultantly, an increase in plastic waste drastically is seen as a trend. Around, 1.5 billion phone cases are disposed of out by people every year.

Conventionally aftermarket covers are known in the art. These covers are removable from the electronic device body. But such covers add bulk and weight to the whole device. Moreover, they are suited only for a selected device and on-device updation a new cover becomes a must purchase. Therefore, these removal device covers fail to provide an elegant solution.

Another known cover includes housing for a portable handheld electronic device. The device can fit inside a housing, having a left side and right side. At least one of the left side and the right side is provided with integral surface features or surface structures to enhance the gripping of the cellphone. However, this solution merely emphasizes grip and not on the variety of device structures available in the market.

A case for holding a portable electronic device includes an anterior portion, a posterior portion, a boot, a transparent covering portion, and a plurality of fasteners. The anterior portion may have a front surface, a back surface, and a screen window. The posterior portion may have a front surface and a back surface. The boot may be flexible and may fit around the portable electronic device. The boot may have a sidewall, a flange extending inwardly from the sidewall, and a rear panel. The sidewall may be between the anterior portion and the posterior portion. The transparent covering portion may have an outer edge, a front surface, and a back surface. The outer edge may be between the boot and the back surface of the anterior portion. The plurality of fasteners may fasten the anterior portion and the posterior portion. This cover is comparatively sophisticated; however, it restricts the flexibility of fasteners. If fasteners are lost the cost of device repair may shoot up, thereby leading to an unpleasant user experience.

A known conventional mobile telephone case includes a top cover having a back surface and a bottom cover having a further back surface that is placed adjacent to the top cover. A connecting member is positioned over at least a portion of each of the back surfaces of the top cover and the further back surface of the bottom cover. In this case, the user can open the mobile phone case by applying pressure to security members and releasing the security members from a locked position. After releasing the security members, the bottom cover can rotate away from the top cover by pivoting around an axis, while still remaining connected by a connecting member. After the bottom cover has rotated away from the top cover, the user is able to access the bottom portion of the phone and can remove the mobile phone from the mobile phone case by sliding the phone out from the top cover and under the overhang. Such a case that uses security members to lock the cover cannot provide full proof protection to the phone as the security members may loosen up due to frequent unlocking of the case. Further, it is clear that such a case will never adapt to a variety of shapes of modern electronic devices.

Therefore, the present invention envisages a cover that solves the drawbacks of the aforementioned conventional art. The present invention further provides a cover more adaptable to a wider range of electronic device models.

OBJECTS

Some of the objects of the present disclosure, which at least one embodiment herein satisfies, are as follows:

An object of the present disclosure is to provide a cover for electronic devices. Preferably for handheld and portable electronic devices.

Another object of the present disclosure is to provide a cover that protects electronic devices from any sort of damage to the outer body and without any of the aforementioned deficiencies.

Yet another object of the present disclosure is to provide a cover that protects electronic devices from collisions or impacts.

Still another object of the present disclosure is to provide a cover that protects electronic devices from wear and tear to sides, back, and front edges.

A further object of the present disclosure is to provide a cover that is eco-friendly.

A still further object of the present disclosure is to provide a cover that is simple in construction and is economical for the user.

An object of the present disclosure is to provide a cover that can be manufactured in large quantities.

Another object of the present disclosure is to provide a cover that on disposing of do not damage the environment.

Yet another object of the present disclosure is to provide a cover that fits in various models of electronic devices.

Still another object of the present disclosure is to provide a cover that has high physical durability and is otherwise well adapted for the purposes intended.

A further object of the present disclosure is to provide a cover that is can be modified irrespective of the shape, size, and/or structure of the portable electronic device.

Another object of the present disclosure is to provide a cover that avoids the above disadvantages and may be considered as a disposable item thereby avoiding any pollution and damage to the environment.

Other objects and advantages of the present disclosure will be more apparent from the following description, which is not intended to limit the scope of the present disclosure.

SUMMARY

This application envisages a biodegradable cover for a portable device that is environmentally friendly and protects the body of an electronic portable device.

To achieve the foregoing objectives, the following technical solutions are used in this invention.

According to the first aspect, a biodegradable cover for a portable device is disclosed.

The cover comprises a top portion including a plurality of adjustable puzzle pieces, wherein the top portion is attached at the back wall of the portable device.

Each puzzle piece further comprises a square piece and at least one magnetic side piece attached to the square piece. Each of the magnetic side pieces of the first puzzle piece is connected to the center of the square piece to define the length and width of different sizes of portable devices.

The puzzle piece further includes an expandable portion comprising a right section and a left section, for extending the biodegradable cover along with the portable device.

The cover further comprises at least one corner portion to attach the top portion with corners of the portable device, wherein the corner portion is adjusted to enable the top portion and the expandable portion of the biodegradable cover to be arranged in a plurality of configurations with respect to one another.

In the first optional implementation of the first aspect, the magnetic side piece of the first puzzle piece is connected to the center of the square piece using an eco-elastic material.

According to a second aspect, the square piece is made out of hemp plastic.

In a preferred embodiment of the first aspect, the biodegradable cover is extended by manually stretching each section of an expandable border.

In the above-preferred embodiment of the first aspect, while stretching a middle part is formed between the right section and the left section, to adjust according to the size of a particular portable device.

In another preferred embodiment of the present invention, each of the puzzle pieces includes two positive and two negative sides arranged diagonally to each other.

In a further embodiment of the present invention, each corner portion is covered with a protective layer.

In a still further embodiment, the protective layer consists of polyurethane placed above the hemp plastic.

BRIEF DESCRIPTION OF DRAWINGS

FIG. 1A is a back view of a portable electronic device housed within a biodegradable cover adapted on according to an embodiment of the present invention;

FIG. 1B is a lateral view a portable electronic device housed within the biodegradable cover of FIG. 1, according to an embodiment of the present invention; and FIG. 2 is puzzle pieces 106-1, 106-2, . . . , 106-n of the biodegradable cover of FIG. 1, according to an embodiment of the present invention; and

REFERENCE NUMERALS

100—Biodegradable cover
102—Portable device
104—Top portion
106—Puzzle piece
108—Corner portion
202—Square piece
204—Magnetic side piece
205 (*a*)—A first magnet
205 (*b*)—A second magnet
206—Expandable portion
a—Positive side
b—Negative side

DESCRIPTION OF EMBODIMENTS

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefits and each can also be used in conjunction with one or more, or some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New electronic device cases and apparatuses are discussed herein that are configured to receive a portable electronic device. It should be understood that for the purposes of understanding the orientation of individual elements or components of the invention, the terms "front" and "front side" shall generally be used to indicate a screen side of the electronic device. Conversely, for the purposes of understanding the orientation of individual elements or components of the invention, the terms "back" and "backside" shall generally be used to indicate a back surface (i.e., faces away from) the primary display screen of the electronic device.

It should also be understood that the terms "right" and "left" are used solely to denote opposite sides of an element, component, or surface in the same manner that "top" and "bottom" are used solely to denote opposite sides of an element, component, or surface and should not unnecessarily be construed as limiting the position or orientation of said element, component, or surface.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

The terminology used herein is for the purpose of describing particular embodiments only and is not intended to be limiting of the invention. As used herein, the term "and/or" includes any and all combinations of one or more of the associated listed items.

As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The term "and/or" in this specification describes only an association relationship for describing associated objects and represents that three relationships may exist. For example, A and/or B may represent the following three cases: Only A exists, both A and B exist, and only B exists.

In addition, in the embodiments of the present invention, the word "example" or "for example" is used to represent giving an example, an illustration, or a description. Any embodiment or design scheme described as an "example" or "for example" in the embodiments of the present invention should not be explained as being more preferred or having more advantages than another embodiment or design scheme. Exactly, the use of the word "example" or "for example" or the like is intended to present a relative concept in a specific manner.

In the description of the embodiment of the present invention, unless otherwise stated, "a plurality of" means two or more than two. For example, a plurality of processing units indicates two or more processing units, and a plurality of systems indicates two or more systems.

The following explains and describes some concepts in a portable electronic device to protect the same.

Now, the present invention will be explained with help of FIGS. 1A and 1B. The present invention discloses a biodegradable cover for a portable electronic device.

The term "electronic device" as used herein is preferably a type of electronic device comprising circuitry and configured to generally perform functions such as recording audio, photos, and videos; displaying or reproducing audio, photos, and videos; storing, retrieving, or manipulation of electronic data. These devices provide electrical communications and network connectivity; or any other similar function.

Non-limiting examples of electronic devices include personal computers (PCs), workstations, laptops, tablet PCs including the iPad, cell phones including iOS phones made by Apple Inc., Android OS phones, Microsoft OS phones, Blackberry phones, digital music players, or any electronic device capable of running computer software and displaying information to a user, memory cards, other memory storage devices, digital cameras with optical zoom and/or lens attachments, external battery packs, external charging devices, HDMI in/out adapters, projectors, and the like.

Certain types of electronic devices which are portable and easily carried by a person from one location to another may sometimes be referred to as a "portable electronic device" or "portable device". Some non-limiting examples of portable devices include; cell phones, smartphones, tablet computers, laptop computers, wearable computers, and the like.

The biodegradable cover can, for example, act as a sleeve, case, label, or skin for an electronic portable device such as a media player, media storage device, cellular phone, PDA, smartphone, computer, and/or the like.

The biodegradable cover 100 for a portable device 102 comprises a top portion 104, sidewalls to adjust the cover, and at least one corner 108.

The top portion includes a plurality of adjustable puzzle pieces 106-1, 106-2, . . . , 106-n which can be seen from FIG. 1B. The top portion 104 is attached to the back wall of the portable device 106.

FIG. 2 illustrates puzzle pieces 106-1, 106-2, . . . , 106-n of the cover 100 closely. Each puzzle piece 106-1, 106-2, . . . , 106-n of the cover 100 comprises a square piece 202, at least one magnetic side 204, and an expandable portion 206. These puzzle pieces 106-1, 106-2, . . . , 106-n are collectively referred to as "106". The puzzle pieces 106 are joined together by the strong magnetic force generated between two puzzle pieces 106-1, 106-2, . . . , 106-n.

The square piece 202 of the puzzle piece 106 is attached to another square piece through at least one magnetic side piece 204. Each of the magnetic sides pieces 204 of the puzzle piece 106 is connected to the center of square piece 202 to define the length and width of different sizes of portable devices 102. Further, each of the magnetic side piece 204 comprises a first magnet 205 (A) and a second 205 (B) (also referred to as magnets 205 (A) and 205 (B)), such that each of these magnets 205 (A) and 205 (B) have a magnetic north and south pole. In one example, the magnets 205 (A) and 205 (B) are adjacent to each other and affixed to at least one magnetic side piece 204 for creating a magnetic north pole field and a magnetic south pole field.

In a substantial embodiment, the square piece 202 is made out of hemp plastic.

The cover 100 further includes an expandable portion 206 between square piece 202 and magnetic side piece 204. The expandable portion 206 comprises a right section and a left section for extending said biodegradable cover 100 along with the portable device 102.

In a preferred aspect of the invention, while stretching a middle part is formed between the right section and the left section, to adjust according to the size of any particular portable device 102.

In a further embodiment, the biodegradable cover 100 is extended by manually stretching each section of an expandable border of the expandable portion 206. Cover 100 includes at least one corner 108 portions to attach the top portion 104 with corners of the portable device 102. The corner portion 108 is adjusted to enable the top portion 104 and the expandable portion 206 of the biodegradable cover 100 to be arranged in a plurality of configurations with respect to one another.

In an embodiment, the attachment of the cover, in non-limiting examples, can be through a lock and fit method, sticking with adhesive, fastening members, plug push structure, etc.

In a first preferred aspect of the invention, the magnetic side piece 204 of the first puzzle piece 106 is connected to the center of square piece 202 using an eco-elastic material.

In another preferred embodiment, the other parts of the cover 100 comprise or be constructed from a softer polymer, elastomer, rubber, or similar resilient material to increase protection and durability of the case 100 against sudden falls/drops and jerks.

In some embodiments, to further provide a protective setup the cover (100) may optionally comprise ARTiLAGE foams, Poron foams, silicone foams, rubber foams, plastic foams, neoprene foam, latex foam rubber, polyurethane foam rubber, or elastomer materials such as elastic plastics, elastic silicone, elastic rubbers, silicone rubbers, or any other suitable elastomer or resilient material.

In a considerable embodiment, each of the puzzle pieces (106) includes two positive (a) and two negative sides (b) arranged diagonally to each other to facilitate the magnetic link between two puzzle pieces. This arrangement of the magnets does not let the same poles face each other and become a barrier in the magnetic linkage of the cover (100).

In an embodiment, each of the corner portion (108) is covered with a protective layer. The protective layer consists of polyurethane placed above the hemp plastic.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and maybe other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or maybe distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware or may be implemented in a form of a software functional unit.

When the integrated unit is implemented in the form of a software functional unit and sold or used as an independent product, the integrated unit may be stored in a computer-readable storage medium. According to such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes any medium that can store program code, such as flash memory, a removable hard disk, a read-only memory, a random access memory, a magnetic disk, or an optical disc.

The foregoing descriptions are merely specific implementations of the present application but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A biodegradable cover (100) for a portable device (102), said cover (100) comprising:
    a top portion (104) including a plurality of adjustable puzzle pieces (106-1, 106-2, . . . , 106-n), wherein said top portion (104) is attached at back wall of said portable device (102), wherein each puzzle piece (106-1, 106-2, . . . , 106-n) further comprises:
        a square piece (202) and at least one magnetic side piece (204) attached to said square piece (202), wherein each of said magnetic side piece (204) of first puzzle piece is connected to center of square piece to define length and width of different sizes of portable devices (102); and
        an expandable portion (206) comprising a right section and a left section, for extending said biodegradable cover along the portable device; and
    at least one corner (108) portion to attach said top portion (104) with corners of said portable device (102), wherein said corner portion (108) is adjusted to enable said top portion (104) and said expandable portion (206) of the biodegradable cover (100) to be arranged in a plurality of configurations with respect to one another.

2. The biodegradable cover (100) as claimed in claim 1, wherein said magnetic side piece (204) of first puzzle piece (106) is connected to center of square piece (202) using an eco-elastic material.

3. The biodegradable cover (100) as claimed in claim 1, wherein said square piece (202) is made out of hemp plastic.

4. The biodegradable cover (100) as claimed in claim 1, wherein said biodegradable cover (100) is extended by manually stretching each section of an expandable border of said expandable portion (206).

5. The biodegradable cover (100) as claimed in claim 4, wherein while stretching a middle part is formed between the right section and the left section, to adjust according to size of a particular portable device (102).

6. The biodegradable cover (100) as claimed in claim 1, wherein each of said puzzle piece (106) includes two positive (a) and two negative sides (b) of said magnetic side pieces (204) arranged diagonally to each other.

7. The biodegradable cover (100) as claimed in claim 3, wherein each of said corner portion (108) is covered with a protective layer.

8. The biodegradable cover (100) as claimed in claim 7, wherein said protective layer consists of polyurethane placed above said hemp plastic.

* * * * *